(12) United States Patent
Kida et al.

(10) Patent No.: US 9,493,667 B2
(45) Date of Patent: *Nov. 15, 2016

(54) UV CURABLE INK JET RECORDING INK COMPOSITION, INK CONTAINER AND INK JET RECORDING APPARATUS

(71) Applicant: Seiko Epson Corporation, Tokyo (JP)

(72) Inventors: Hiroaki Kida, Shiojiri (JP); Hiroshi Fukumoto, Shiojiri (JP); Keitaro Nakano, Matsumoto (JP); Toyohiko Mitsuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,281

(22) Filed: Nov. 15, 2013

(65) Prior Publication Data

US 2014/0132682 A1 May 15, 2014

(30) Foreign Application Priority Data

Nov. 15, 2012 (JP) ................................. 2012-250940

(51) Int. Cl.
*B41J 2/21* (2006.01)
*C09D 11/38* (2014.01)
*C09D 11/101* (2014.01)

(52) U.S. Cl.
CPC .............. *C09D 11/38* (2013.01); *B41J 2/2107* (2013.01); *C09D 11/101* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ........ 347/100, 95, 96, 101, 85, 86; 523/161, 523/160; 106/31.6, 31.13, 31.27
See application file for complete search history.

(56) References Cited

U.S. PATENT DOCUMENTS 2,692,256 A 10/1954 Bauer
4,303,924 A 12/1981 Young, Jr.
(Continued)

FOREIGN PATENT DOCUMENTS

EP 0 997 508 A1 5/2000
EP 2 017 311 A1 1/2009
(Continued)

OTHER PUBLICATIONS

U.S. Appl. No. 13/234,666, filed Sep. 16, 2011, Ultraviolet-Curable Ink Jet Ink Composition.
(Continued)

*Primary Examiner* — Manish S Shah
(74) *Attorney, Agent, or Firm* — Nutter McClennen & Fish LLP; John J. Penny, Jr.; Alex Nagorniy

(57) ABSTRACT

The UV curable ink jet recording ink composition contains a thioxanthone-based photopolymerization initiator and a hindered amine compound. The dissolved oxygen content in the ink composition is 20 ppm or less.

18 Claims, 1 Drawing Sheet

(56) References Cited

U.S. PATENT DOCUMENTS

| | | | |
|---|---|---|---|
| 4,577,205 A | 3/1986 | Shibata et al. | |
| 5,266,106 A | 11/1993 | Breton | |
| 5,275,646 A | 1/1994 | Marshall et al. | |
| 5,596,027 A | 1/1997 | Mead et al. | |
| 5,641,346 A | 6/1997 | Mantell et al. | |
| 5,889,084 A | 3/1999 | Roth | |
| 5,897,695 A | 4/1999 | Mayo et al. | |
| 6,187,897 B1 | 2/2001 | Kawashima et al. | |
| 6,310,115 B1 | 10/2001 | Vanmaele et al. | |
| 7,963,625 B2 | 6/2011 | Okada | |
| 8,227,047 B2 | 7/2012 | Loccufier et al. | |
| 8,664,291 B2 | 3/2014 | Kida et al. | |
| 9,034,940 B2 | 5/2015 | Kida et al. | |
| 9,056,986 B2 | 6/2015 | Kagose et al. | |
| 2003/0162868 A1* | 8/2003 | Stretanski | C08K 5/1345 524/100 |
| 2004/0075726 A1 | 4/2004 | Hirai | |
| 2004/0106700 A1* | 6/2004 | Yamanouchi | C09D 11/32 523/160 |
| 2006/0050116 A1 | 3/2006 | Nakajima | |
| 2007/0035594 A1 | 2/2007 | Brooks et al. | |
| 2007/0229612 A1* | 10/2007 | Oyanagi et al. | 347/85 |
| 2008/0199631 A1 | 8/2008 | Makuta et al. | |
| 2008/0218574 A1 | 9/2008 | Furuno et al. | |
| 2008/0254234 A1* | 10/2008 | Fink et al. | 427/595 |
| 2009/0000508 A1 | 1/2009 | Edison et al. | |
| 2009/0040249 A1 | 2/2009 | Wouters et al. | |
| 2009/0041946 A1 | 2/2009 | Fukumoto et al. | |
| 2009/0053484 A1 | 2/2009 | Yoshihiro et al. | |
| 2009/0068418 A1 | 3/2009 | Iwase et al. | |
| 2009/0099277 A1 | 4/2009 | Nagvekar et al. | |
| 2009/0118388 A1 | 5/2009 | Naruse et al. | |
| 2009/0197988 A1 | 8/2009 | Kito et al. | |
| 2009/0208651 A1* | 8/2009 | Oyanagi | C09D 11/101 427/256 |
| 2009/0280302 A1 | 11/2009 | Fukumoto et al. | |
| 2009/0289999 A1 | 11/2009 | Takahashi et al. | |
| 2009/0303304 A1 | 12/2009 | Oyanagi et al. | |
| 2010/0079566 A1 | 4/2010 | Ishikawa | |
| 2010/0112497 A1 | 5/2010 | Takabayashi et al. | |
| 2010/0313782 A1 | 12/2010 | Loccufier et al. | |
| 2010/0330296 A1 | 12/2010 | Loccufier et al. | |
| 2011/0015294 A1 | 1/2011 | Kito et al. | |
| 2011/0091790 A1 | 4/2011 | Barnwell et al. | |
| 2011/0165387 A1 | 7/2011 | Kondo | |
| 2011/0234680 A1 | 9/2011 | Aoyama et al. | |
| 2012/0014005 A1 | 1/2012 | Kliem | |
| 2012/0075394 A1 | 3/2012 | Ohnishi | |
| 2012/0083545 A1 | 4/2012 | Kida et al. | |
| 2012/0113201 A1 | 5/2012 | Kagose et al. | |
| 2012/0128890 A1 | 5/2012 | Mirchev | |
| 2012/0140005 A1 | 6/2012 | De Voeght et al. | |
| 2012/0147095 A1 | 6/2012 | Miura et al. | |
| 2012/0274717 A1 | 11/2012 | Nakano et al. | |
| 2013/0010039 A1 | 1/2013 | Kida et al. | |
| 2013/0063535 A1 | 3/2013 | Yoda et al. | |
| 2013/0250019 A1 | 9/2013 | Sato et al. | |
| 2013/0258016 A1 | 10/2013 | Yoshida et al. | |
| 2013/0258018 A1 | 10/2013 | Nakajima et al. | |
| 2013/0286120 A1 | 10/2013 | Kobayashi et al. | |
| 2013/0286121 A1 | 10/2013 | Fukumoto et al. | |
| 2014/0128496 A1 | 5/2014 | Kida et al. | |
| 2015/0225581 A1 | 8/2015 | Kida et al. | |
| 2015/0240094 A1 | 8/2015 | Kagose et al. | |
| 2016/0001578 A1 | 1/2016 | Kobayashi et al. | |
| 2016/0046134 A1 | 2/2016 | Fukumoto et al. | |

FOREIGN PATENT DOCUMENTS

| | | |
|---|---|---|
| EP | 2 266 812 A2 | 12/2010 |
| EP | 2 305 762 A1 | 4/2011 |
| EP | 2 335 940 A1 | 6/2011 |
| EP | 2 399 965 A1 | 12/2011 |
| EP | 2 399 966 A1 | 12/2011 |
| EP | 2 543 707 A1 | 1/2013 |
| EP | 2 568 022 A2 | 3/2013 |
| JP | 2000-052596 A | 2/2000 |
| JP | 2002-326976 A | 11/2002 |
| JP | 2003-089198 A | 3/2003 |
| JP | 2003-200559 A | 7/2003 |
| JP | 3461501 B1 | 10/2003 |
| JP | 2004-067991 A | 3/2004 |
| JP | 2004-167873 A | 6/2004 |
| JP | 2004-196936 A | 7/2004 |
| JP | 2004-224841 A | 8/2004 |
| JP | 2005-103854 A | 4/2005 |
| JP | 2005-212412 A | 8/2005 |
| JP | 2005-214395 A | 8/2005 |
| JP | 2006-231795 A | 9/2006 |
| JP | 2007-118409 A | 5/2007 |
| JP | 2007-138070 A | 6/2007 |
| JP | 2007-185852 A | 7/2007 |
| JP | 2008-507598 A | 3/2008 |
| JP | 2008-207425 A | 9/2008 |
| JP | 2008-280383 A | 11/2008 |
| JP | 1204333 B2 | 1/2009 |
| JP | 2009-040880 A | 2/2009 |
| JP | 2009-057548 A | 3/2009 |
| JP | 2009-073945 A | 4/2009 |
| JP | 2009-096043 A | 5/2009 |
| JP | 2009-096910 A | 5/2009 |
| JP | 2009-185157 A | 8/2009 |
| JP | 4321050 B2 | 8/2009 |
| JP | 4335955 B1 | 9/2009 |
| JP | 2009-279830 A | 12/2009 |
| JP | 2009-285853 A | 12/2009 |
| JP | 2009-292091 A | 12/2009 |
| JP | 2010-012629 A | 1/2010 |
| JP | 2010-023285 A | 2/2010 |
| JP | 2010-131975 A | 6/2010 |
| JP | 2010-143974 A | 7/2010 |
| JP | 2010-167677 A | 8/2010 |
| JP | 2010-269471 A | 12/2010 |
| JP | 2010-280828 A | 12/2010 |
| JP | 2011-025684 A | 2/2011 |
| JP | 2011-051107 A | 3/2011 |
| JP | 2011-126269 A | 6/2011 |
| JP | 2011-523370 A | 8/2011 |
| JP | 2011-184609 A | 9/2011 |
| JP | 2011-184610 A | 9/2011 |
| JP | 2011-208018 A | 10/2011 |
| JP | 2011-240565 A | 12/2011 |
| JP | 2012-020481 A | 2/2012 |
| JP | 2012-092291 A | 5/2012 |
| JP | 5772032 B2 | 9/2015 |
| WO | 2006/085992 A2 | 8/2006 |
| WO | 2007/094446 A1 | 8/2007 |
| WO | 2007/126103 A1 | 11/2007 |
| WO | 2009/053305 A1 | 4/2009 |
| WO | 2010/029017 A1 | 3/2010 |
| WO | 2010/069758 A1 | 6/2010 |
| WO | 2011/039081 A1 | 4/2011 |

OTHER PUBLICATIONS

U.S. Appl. No. 13/292,219, filed Nov. 9, 2011, Ultraviolet Curable Type Ink-Jet Ink Composition, Recording Method and Recording Apparatus Usisng Same.

U.S. Appl. No. 13/851,426, filed Mar. 27, 2013, Ink Jet Recording Method, Ultraviolet Curable Ink and Ink Jet Recording Apparatus.

U.S. Appl. No. 13/851,627, filed Mar. 27, 2013, Ink Jet Recording Method, Ultraviolet Curable Ink, and Ink Jet Recording Apparatus.

U.S. Appl. No. 13/853,120, filed Mar. 29, 2013, Ink Jet Recording Method, Ultraviolet-Ray Curable Ink, and Ink Jet Recoording Apparatus.

U.S. Appl. No. 13/853,185, filed Mar. 29, 2013, Ink Jet Recording Method, Ultraviolet-Ray Curable Ink, and Ink Jet Recording Apparatus.

U.S. Appl. No. 14/155,588, filed Jan. 15, 2014, Ultraviolet-Curable Ink Jet Ink Composition.

(56) References Cited

OTHER PUBLICATIONS

U.S. Appl. No. 14/689,502, filed Apr. 17, 2015, Ultraviolet-Curable Ink Jet Ink Composition.
U.S. Appl. No. 14/708,325, filed May 11, 2015, Ultraviolet Curable Type Ink-Jet Ink Composition, Recording Method and Recording Apparatus Using the Same.
U.S. Appl. No. 14/856,092, filed Sep. 16, 2015, Ink Jet Recording Method, Ultraviolet-Ray Curable Ink, and Ink Jet Recording Apparatus.
U.S. Appl. No. 14/920,966, filed Oct. 23, 2015, Ink Jet Recording Method and Ink Jet Recording Apparatus.
U.S. Appl. No. 15/014,361, filed Feb. 3, 2016 Ink, Jet Recording Method, Ultraviolet Curable Ink and Ink Jet Recording Apparatus.
[NoAuthorListed] BASF Product Brochure (no date available), Coatings that stay looking good: BASF performance additive. BASF Product Guide. (online) URL: http://www.basf.com/group/corporate/us/en/literature-document:Brand+Chimassorb-Brochure-Coatings+that+stay+looking+good+BASF+performance+additives-English.pdf.
Keskin et al., "2-Mercaptothioxanthone as sensitizers and coinitiators for acylphosphine oxide photoinitiators for free radical polymerization," Macromolecules, 2008, v. 41, pp. 4631-4634.

\* cited by examiner

UV CURABLE INK JET RECORDING INK COMPOSITION, INK CONTAINER AND INK JET RECORDING APPARATUS

BACKGROUND

1. Technical Field

The present invention relates to a UV curable ink jet recording ink composition, an ink container containing the ink composition, and an inkjet recording apparatus.

2. Related Art

Various techniques are applied to recording processes for forming images on a recording medium, such as paper, according to image data signals. Among such techniques is an ink jet technique in which images are formed directly on a recording medium by ejecting an ink only onto desired image portions, using an inexpensive apparatus. In the ink jet technique, inks are efficiently used, and accordingly running cost can be reduced. In addition, little noise is produced when the ink jet technique is used, and the ink jet technique is thus advantageous as a recording method.

In order to form an image having high fastness to water, solvents, rubbing and so forth on the surface of a recording medium, UV curable ink jet recording inks that can be cured by being irradiated with UV radiation have been used in an ink jet recording method in recent years.

For example, JP-A-2007-138070 discloses an ink jet ink containing a coloring material, water, and an active energy radiation-crosslinkable polymer that includes a hydrophilic main chain having a plurality of side chains and can form a cross link between the side chains by being irradiated with active energy radiation. In this ink, the dissolved oxygen content is 0.05 to 1.8 ppm at 25° C. According to the disclosure, the ink can be easily discharged and can form highly glossy images having high rub fastness without bleeding (paragraph 0023 in JPA-2007-138070).

For example, JP-A-2004-196936 discloses a UV curable ink jet ink containing a water-soluble solvent, and at least a coloring material, a UV polymerizable compound and a photopolymerization initiator in the water-soluble solvent, and having a dissolved oxygen content of 0.1 to 2 ppm at 25° C. According to this disclosure, the ink can be stably discharged over a long time (paragraph 0017 and 0019 in JP-A-2004-196936)).

However, the inks disclosed in the above-cited patent documents are undesirably inferior in at least any of curability, storage stability and ejection stability.

SUMMARY

An advantage of some aspects of the invention is that it provides a UV curable ink jet recording ink composition superior in curability, storage stability and ejection stability.

Another advantage of the invention is that it provides an ink container containing the UV curable ink jet recording ink composition, and an ink jet recording apparatus that uses the UV curable ink jet recording ink composition.

The present inventors have conducted intensive research to solve the above issue. The inventors first used thioxanthone-based photopolymerization initiators advantageous in solubility, safety and cost. However, it was found that ink compositions containing a thioxanthone-based photopolymerization initiator tend to exhibit markedly low ejection stability when the dissolved oxygen content is high. The inventors thought that it might be effective in improving the ejection stability to suppress the occurrence of air bubbles by reducing the dissolved oxygen content in the ink composition to a specific value or less. However, a UV curable ink composition having a low dissolved oxygen is inferior in storage stability because the oxygen in such an ink composition cannot sufficiently inhibit the polymerization (dark reaction) of the ink. The inventors then found that an ink composition further containing a hindered amine polymerization inhibitor can be stably stored. Thus, the inventors found that an ink composition can overcome the above-described issue, which contains thioxanthone-based photopolymerization initiator and a hindered amine compound and has a dissolved oxygen content (dissolved air content) reduced to a specific value or less.

According to an aspect of the invention, a UV curable ink jet recording ink composition having the following features is provided.

The UV curable ink jet recording ink composition contains a thioxanthone-based photopolymerization initiator and a hindered amine compound. The dissolved oxygen content in the ink composition is 20 ppm or less.

The thioxanthone-based photopolymerization initiator content in the ink composition may be 0.5% to 4% by mass.

The hindered amine compound may have a 2,2,6,6-tetramethylpiperidine-N-oxyl skeleton.

The thioxanthone-based photopolymerization initiator may contain at least one compound selected from the group consisting of thioxanthone, diethylthioxanthone, isopropylthioxanthone, and chlorothioxanthone.

Preferably, the thioxanthone-based photopolymerization initiator contains diethylthioxanthone.

The UV curable ink jet recording ink composition may further contain an acylphosphine oxide-based photopolymerization initiator.

The dissolved oxygen content in the UV curable ink jet recording ink composition may be in the range of 5 to 20 ppm.

According to another aspect of the invention, an ink container is provided which includes the UV curable ink jet recording ink composition and a member in contact with the ink composition.

The member may be made of a material having an oxygen permeation rate of 5.0 cc·20 μm/(m²·day·atm) or less at a temperature of 23° C. and a relative humidity of 65%.

According to still another aspect of the invention, an ink jet recording apparatus is provided which includes an ejection device that ejects the UV curable ink jet recording ink composition from a head in a state where the dissolved oxygen content is 20 ppm or less.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
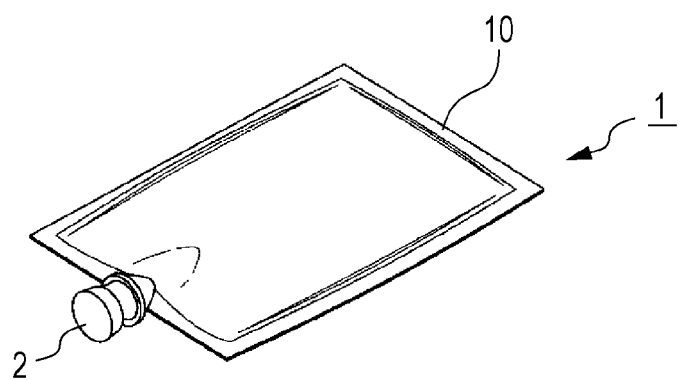
FIG. 1 is a perspective view of an ink bag that is an ink container according to an embodiment of the invention.

Embodiments of the invention will now be described in detail. The invention is not limited to the following embodiments, and various modifications may be made within the scope and spirit of the invention.

The term "curability" mentioned herein is a property of an ink composition that represents the degree in which the ink can be cured by responding to light. Also, the term "storage stability" is a property of an ink composition that represents the degree in which the viscosity of the ink does not vary during storage. The term "ejection stability" is a property of an ink composition that represents the degree in which the ink is stably ejected in the form of droplets through nozzles without clogging the nozzles.

In the description, the term "(meth)acrylate" refers to at least either an acrylate or the corresponding methacrylate, and "(meth)acrylic" compound refers to at least either an acrylic compound or the corresponding methacrylic compound. "(Meth)acryloyl" refers to at least either an acryloyl or the corresponding methacryloyl.

UV-Curable Ink Jet Recording Ink Composition

The UV curable ink jet recording ink composition of an embodiment of the invention (hereinafter simply referred to as the ink composition) contains a thioxanthone-based photopolymerization initiator and an hindered amine compound, and has a dissolved oxygen content of 20 ppm or less.

Possible constituents of the ink composition will now be described.

Thioxanthone-Based Photopolymerization Initiator

The ink composition of the present embodiment contains a thioxanthone-based photopolymerization initiator, which is advantageous in solubility, safety, and cost. The thioxanthone-based photopolymerization initiator is used for curing the ink composition on the surface of the recording medium by photopolymerization caused by UV irradiation, thereby forming printed images or characters. The use of the thioxanthone-based photopolymerization initiator can enhance the curability of the ink composition. Ultraviolet (UV) light may be used as radiation. UV light is superior in safety, and the use of UV light reduces the cost of light source.

Thioxanthone-based photopolymerization initiators suitably used in the ink composition include, but are not limited to, thioxanthone, diethylthioxanthone, isopropylthioxanthone, and chlorothioxanthone. These may be used singly or in combination. Preferred diethylthioxanthone may be, but is not limited to, 2,4-diethylthioxanthone; preferred isopropylthioxanthone may be, but is not limited to, 2-isopropylthioxanthone; and preferred chlorothioxanthone may be, but is not limited to, 2-chlorothioxanthone. The ink composition containing such a thioxanthone-based photopolymerization initiator tends to exhibit high curability, storage stability, and ejection stability. A thioxanthone-based photopolymerization initiator containing diethylthioxanthone is particularly advantageous. Diethylthioxanthone can change the polymerizable compound in the ink composition into an active species with UV radiation in a wide range of wavelengths.

Commercially available thioxanthone-based photopolymerization initiators may be used. These include, but are not limited to, Speedcure DETX (2,4-diethylthioxanthone) and Speedcure ITX (2-isopropylthioxanthone), each produced by Lambson, and KAYACURE DETX-S (2,4-diethylthioxanthone) produced by Nippon Kayaku Co., Ltd.

The thioxanthone-based photopolymerization initiator content is preferably 0.5% to 4% by mass, more preferably 1% to 4% by mass, relative to the total mass (100% by mass) of the ink composition. When the thioxanthone-based photopolymerization initiator content is 0.5% by mass or more, the ink composition tends to exhibit high curability. When this content is 4% by mass or less, the ink composition tends to maintain good ejection stability more effectively. However, the use of a thioxanthone-based photopolymerization initiator in an ink composition having a high dissolved oxygen content markedly reduces the stability of ejecting the ink composition from the recording head. This is probably because the thioxanthone-based photopolymerization initiator present in the form of fine particles in the ink composition acts as cores of air bubbles and thus helps the ink composition to release dissolved oxygen as air bubbles. This is merely a conjecture, and there may be other causes.

Additional Photopolymerization Initiator

The ink composition may further contain other photopolymerization initiators. Any photopolymerization initiator can be used as long as it can produce an active species, such as a radical or a cation, with light (UV) energy, and thus initiate a polymerization of the polymerizable compound in the ink composition. For example, a photo-radical polymerization initiator or a photo-cationic polymerization initiator may be used, and preferably, a photo-radical polymerization initiator is used.

Examples of the photo-radial polymerization initiator include, but are not limited to, aromatic ketones, acylphosphine oxides, aromatic onium salts, organic peroxides, thio compounds (such as thiophenyl group-containing compounds), α-aminoalkylphenone compounds, hexaaryl biimidazole compounds, ketoxime ester compounds, borates, azinium compounds, metallocene compounds, active ester compounds, compounds having a carbon-halogen bond, and alkylamine compounds.

Among these, acylphosphine oxide-based photopolymerization initiators such as acylphosphine oxides are preferably used. Combined use of an acylphosphine oxide-based photopolymerization initiator and a thioxanthone-based photopolymerization initiator is suitable for UV-LED curing processes and can enhance the curability of the ink composition.

Acylphosphine oxide-based photopolymerization initiators include, but are not limited to, bis(2,4,6-trimethylbenzoyl)phenylphosphine oxide, (2,4,6-trimethylbenzoyl)diphenylphosphine oxide, and bis(2,6-dimethoxybenzoyl)-2,4,4-trimethylpentylphosphine oxide.

Commercially available acylphosphine oxide-based photopolymerization initiators include, but are not limited to, IRGACURE 819 (bis(2,4,6-trimethylbenzoyl)phenylphosphine oxide) and DAROCUR TPO ((2,4,6-trimethylbenzoyl)diphenylphosphine oxide.

Other photo-radical polymerization initiators may be used without particular limitation. Examples of such a photo-radical polymerization initiator include acetophenone, acetophenone benzylketal, 1-hydroxycyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropane-1-one, 2-hydroxy-2-methyl-1-phenylpropane-1-one, and 2-methyl-1-[4-(methylthio)phenyl]-2-morpholinopropane-1-one.

Commercially available photo-radical polymerization initiators include, but are not limited to, IRGACURE 651 (2,2-dimethoxy-1,2-diphenylethane-1-one), IRGACURE 184 (1-hydroxycyclohexyl phenyl ketone), DAROCUR 1173 (2-hydroxy-2-methyl-1-phenylpropane-1-one), IRGACURE 2959 (1-[4-(2-hydroxyethoxy)phenyl]-2-hydroxy-2-methyl-1-propane-1-one), IRGACURE 127 (2-hydroxy-1-{4-[4-(2-hydroxy-2-methylpropionyl)benzyl]phenyl}-2-methylpropane-1-one), IRGACURE 907 (2-methyl-1-(4-methylthiophenyl)-2-morpholinopropane-1-one), IRGACURE 369 (2-benzyl-2-dimethylamino-1-(4-morpholinophenyl)butanone-1), IRGACURE 379 (2-(dimethylamino)-2-[(4-methylphenyl)methyl]-1-[4-(4-morpholinyl)phenyl]-1-butanone), IRGACURE 784 (bis(η5-2,4-cyclopentadiene-1-yl)-bis(2,6-difluoro-3-(1H-pyrrole-1-yl)phenyl) titanium), IRGACURE OXE 01 (1,2-octanedione, 1-[4-(phenylthio)phenyl]-, 2-(O-benzoyloxime)), IRGACURE OXE 02 (ethanone, 1-[9-ethyl-6-(2-methylbenzoyl)-9H-carbazole-3-yl]-, 1-(O-acetyloxime)), and IRGACURE 754 (mixture of oxyphenyl acetic acid, 2-[2-oxo-2-phenylacetoxyethoxy]ethyl ester and 2-(2-hydroxyethoxy)ethyl ester) (each produced by BASF); Speedcure TPO (produced by Lambson); Lucirin TPO, LR 8893 and LR 8970 (each produced by BASF); and Ubecryl P36 (produced by UCB).

Photo-cationic polymerization initiators include, but are not limited to, sulfonium salts and iodonium salts.

Commercially available photo-cationic polymerization initiators include, but are not limited to, Irgacure 250 and Irgacure 270.

The above photopolymerization initiators may be used singly or in combination.

The photopolymerization initiator content is preferably 5% to 20% by mass relative to the total mass (100% by mass) of the ink composition. When the photopolymerization initiator content is in such a range, the ink composition can be rapidly cured with UV light, completely dissolved in the ink composition without remaining in an insoluble state, and prevented from being stained by the photopolymerization initiator.

Hindered Amine Compound

The ink composition of the present embodiment contains a hindered amine compound. In general, as the dissolved oxygen content in a UV curable ink composition is reduced, the storage stability of the ink composition decreases because the oxygen in such an ink composition cannot sufficiently inhibit the polymerization (dark reaction) of the ink. However, the presence of a hindered amine-based polymerization inhibitor in the ink composition allows the ink composition to be stably stored even if the dissolved oxygen content is low.

Examples of the hindered amine compound include, but are not limited to, compounds having a 2,2,6,6-tetramethylpiperidine-N-oxyl skeleton, compounds having a 2,2,6,6-tetramethylpiperidine skeleton, compounds having a 2,2,6,6-tetramethylpiperidine-N-alkyl skeleton, and compounds having a 2,2,6,6-tetramethylpiperidine-N-acyl skeleton.

Hindered amine compounds are commercially available. Examples of such a hindered amine compound include ADK STAB series LA-7RD (2,2,6,6-tetramethyl-4-hydroxypiperidin-1-oxyl), LA-52, LA-57, LA-62, LA-63P, LA-68LD, LA-77Y, LA-77G, LA-81, LA-82 (1,2,2,6,6-pentamethyl-4-piperidyl methacrylate), and LA-87 (each produced by ADEKA); IRGASTAB UV 10 (4,4'-[1,10-dioxo-1,10-decanediyl)bis(oxy)]bis[2,2,6,6-tetramethyl]-1-piperidinyloxy, CAS. 2516-92-9), TINUVIN 123 (4-hydroxy-2,2,6,6-tetramethylpiperidine-N-oxyl), TINUVIN 111FDL, TINUVIN 144, TINUVIN 152, TINUVIN 292, TINUVIN 765, TINUVIN 770DF, TINUVIN 5100, SANOL LS-2626, CHIMASSORB 119FL, CHIMASSORB 2020 FDL, CHIMASSORB 944 FDL, and TINUVIN 622 LD (each produced by BASF); and FA-711HM and FA-712HM (2,2,6,6-tetramethylpiperidinyl methacrylate, produced by Hitachi Chemical Company, Ltd).

Among the above-cited compounds, LA-82 is a compound having a 2,2,6,6-tetramethylpiperidine-N-methyl skeleton, and ADK STAB LA-7RD, IRGASTAB UV 10 and TINUVIN 123 are compounds having a 2,2,6,6-tetramethylpiperidine-N-oxyl skeleton.

Compounds having a 2,2,6,6-tetramethylpiperidine-N-oxyl skeleton are particularly advantageous because such compounds allow the ink composition to maintain its high curability and can enhance the storage stability of the ink composition.

Other compounds having a 2,2,6,6-tetramethylpiperidine-N-oxyl skeleton include, but are not limited to, bis(1-oxyl-2,2,6,6-tetramethylpiperidin-4-yl) sebacate and bis(2,2,6,6-tetramethyl-1-(octyloxy)-4-piperidinyl) decanedioate.

Hindered amine compounds may be used singly or in combination.

The hindered amine compound content is preferably 0.05% to 0.5% by mass, more preferably 0.1% to 0.5% by mass, relative to the total mass (100% by mass) of the ink composition. When it is 0.05% by mass or more, the ink composition can exhibit high storage stability, and when it is 0.1% by mass or more, the storage stability can be still higher. In addition, when it is 0.5% by mass or less, the ink composition can exhibit high curability.

Additional Polymerization Inhibitor

The ink composition of the present embodiment may further contain additional polymerization inhibitor other than hindered amine compounds. Examples of such a polymerization inhibitor include, but are not limited to, p-methoxyphenol, hydroquinone monomethyl ether (MEHQ), hydroquinone, cresol, t-butylcatechol, 3,5-di-t-butyl-4-hydroxytoluene, 2,2'-methylene-bis(4-methyl-6-t-butylphenol), 2,2'-methylene-bis(4-ethyl-6-butylphenol), and 4,4'-thio-bis(3-methyl-6-t-butylphenol).

These additional polymerization inhibitors may be used singly or in combination. The additional polymerization inhibitor content depends on the content of other constituents and is not particularly limited.

Dissolved Oxygen Content

In the ink composition of the present embodiment, the dissolved oxygen content is limited to 20 ppm or less. In an ink composition containing a thioxanthone-based photopolymerization initiator, the thioxanthone-based photopolymerization initiator is present in the form of fine particles, and the particles act as cores of air bubbles and thus help the ink composition to release dissolved oxygen as air bubbles. When the dissolved oxygen content is 20 ppm or less, however, air bubbles are not much generated even though a thioxanthone-based photopolymerization initiator is contained. Thus, the ink composition can be stably ejected. The dissolved oxygen content can be reduced to 20 ppm or less by deaeration.

The ink composition of the present embodiment exhibits high ejection stability and is accordingly suitable for use in ink jet recording apparatuses. When an ink passes through the ink flow channels in an ink jet recording apparatus, air may dissolve in the ink to increase the dissolved oxygen content in the ink. In the present embodiment, however, the dissolved oxygen content in the ink composition is as low as 20 ppm or less. Accordingly, it is not increased to the extent that the storage stability is adversely affected even if air dissolves in the ink composition flowing through the ink flow channels. Consequently, the ink composition can exhibit high ejection stability and curability when an ink jet recording apparatus charged with the ink composition transferred from an ink container performs recording.

The dissolved oxygen content is preferably 1 to 20 ppm, more preferably 3 to 20 ppm, and still more preferably 5 to 20 ppm. In particular, when the dissolved oxygen content is 1 ppm or more, preferably 5 ppm or more, polymerization of the polymerizable compound is inhibited more effectively. Accordingly, the ink composition is likely to be more stably stored. The ink composition of the present embodiment contains any of the above-described hindered amine compounds as a polymerization inhibitor and has a dissolved oxygen content limited to a specific range, thereby exhibiting extremely high storage stability.

The dissolved oxygen content is not always in the above range, as long as the ink composition has such a dissolved oxygen content when it is transferred into an ink jet recording apparatus. More specifically, the dissolved oxygen content is in the above range desirably in the period between the time when an ink container containing the ink composition has been shipped and the time immediately before the ink container or the ink composition therein is used or transferred to a recording apparatus. If the recording apparatus includes a deaeration mechanism, the dissolved oxygen content can be reduced in the recording apparatus. However, since the capability of deaeration is likely to be limited even in such a case, it is desirable that the dissolved oxygen content in the ink composition be within the above range in an ink container. On the other hand, a recording apparatus that hardly varies the dissolved oxygen content need not have a deaeration mechanism, as long as the dissolved oxygen content of the ink composition is controlled in the above range in the ink container.

The dissolved oxygen content can be measured by a known method, and the dissolved oxygen content mentioned herein is a value measured by the method described in Examples below for the sake of convenience.

The dissolved oxygen content in an ink composition before deaeration, which is intended to reduce the dissolved oxygen content, is generally about 50 to 60 ppm. Therefore, deaeration is performed to control the dissolved oxygen content to 20 ppm or less. For deaeration, a deaeration mechanism may be used, or bubbling with an inert gas may be applied.

Polymerizable Compound

The ink composition may contain a polymerizable compound. The polymerizable compound, by itself or with a function of the photopolymerization initiator, is polymerized by irradiation with light and thus cures the ink composition deposited on a recording medium. Examples of the polymerizable compounds include, but are not limited to, known monofunctional, bifunctional, trifunctional and higher polyfunctional monomers and oligomers. These polymerizable compounds may be used singly or in combination. Polymerizable compounds will be further described below.

Monofunctional, bifunctional, trifunctional and higher polyfunctional monomers include, but are not limited to, (meth)acrylic acid, itaconic acid, crotonic acid, isocrotonic acid, maleic acid and other unsaturated carboxylic acids, and their salts; esters, urethanes, amides and anhydrides of those unsaturated carboxylic acids; and acrylonitrile, styrene, unsaturated polyesters, unsaturated polyethers, unsaturated polyamides, and unsaturated urethanes. Monofunctional, bifunctional, trifunctional and higher polyfunctional oligomers include oligomers produced from the above monomers, such as linear acrylic oligomers, epoxy (meth)acrylates, oxetane (meth)acrylates, aliphatic urethane (meth)acrylates, aromatic urethane (meth)acrylates, and polyester (meth)acrylates.

The polymerizable compound may contain an N-vinyl compound as another monofunctional or polyfunctional monomer. Examples of the N-vinyl compound include, but are not limited to, N-vinylformamide, N-vinylcarbazole, N-vinylacetamide, N-vinylpyrrolidone, N-vinylcaprolactam and acryloyl morpholine, and derivatives of these N-vinyl compounds.

Among the above-described polymerizable compounds, (meth)acrylic acid esters, that is, (meth)acrylates, are particularly suitable.

Monofunctional (meth)acrylates include, but are not limited to, isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, flexible lactone-modified (meth)acrylate, t-butylcyclohexyl (meth)acrylate, dicyclopentanyl (meth)acrylate, and dicyclopentenyloxyethyl (meth)acrylate. Among these, phenoxyethyl (meth)acrylate is preferred.

Preferably, the monofunctional (meth)acrylate content is 30% to 85% by mass, more preferably 40% to 75% by mass, relative to the total mass (100% by mass) of the ink composition. By controlling this content in such a range, the initiator can be satisfactorily dissolved, and the ink composition can exhibit higher curability, storage stability and ejection stability.

The monofunctional (meth)acrylate may contain a vinyl ether group. Examples of such a monofunctional (meth)acrylate include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethyl propyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, polypropylene glycol monovinyl ether (meth)acrylate, phenoxyethyl (meth)acrylate, isobornyl (meth)acrylate, and benzyl (meth)acrylate. Among these, preferred are 2-(vinyloxyethoxy)ethyl (meth)acrylate, phenoxyethyl (meth)acrylate, isobornyl (meth)acrylate, and benzyl (meth)acrylate.

In particular, 2-(vinyloxyethoxy)ethyl (meth)acrylates, that is, 2-(vinyloxyethoxy)ethyl acrylate and 2-(vinyloxyethoxy)ethyl methacrylate, are preferred, and 2-(vinyloxyethoxy)ethyl acrylate is more preferred. The use of these polymerizable compounds reduces the viscosity of the ink composition and enhances the curability of the ink composition. Also, these compounds have high flash points. In particular, since 2-(vinyloxyethoxy)ethyl acrylate and 2-(vinyloxyethoxy)ethyl methacrylate have simple structures and low molecular weights, the viscosity of the ink composition can be significantly reduced. Examples of the 2-(vinyloxyethoxy)ethyl (meth)acrylate include 2-(2-vinyloxyethoxy)ethyl methacrylate, 2-(1-vinyloxyethoxy)ethyl methacrylate, 2-(2-vinyloxyethoxy)ethyl acrylate, and 2-(1-vinyloxyethoxy)ethyl acrylate. In terms of curability, 2-(vinyloxyethoxy)ethyl acrylate is superior to 2-(vinyloxyethoxy)ethyl methacrylate.

The content of the (meth)acrylate having a vinyl ether group, particularly the 2-(vinyloxyethoxy)ethyl (meth)acrylate content, is preferably 10% to 70% by mass, more preferably 30% to 50% by mass, relative to the total mass (100% by mass) of the ink composition. The ink composition containing 10% by mass or more of such a (meth)acrylate can have a low viscosity and exhibit high curability. Also, when the content of such a (meth)acrylate is 70% by mass or less, the ink composition can be stably stored.

Exemplary bifunctional (meth)acrylates include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A ethylene oxide adduct di(meth)acrylate, bisphenol A propylene oxide adduct di(meth)acrylate, hydroxypivalic acid neopentyl glycol di(meth)acrylate, and polytetramethylene glycol di(meth)acrylate, and diethylene glycol di(meth)acrylate. Trifunctional or higher polyfunctional (meth)acrylates may have a pentaerythritol or dipentaerythritol skeleton. Among these, preferred are dipropylene glycol di(meth)acrylate, tripropylene glycol di(meth)acrylate, diethylene glycol di(meth)acrylate, triethylene glycol di(meth)acrylate, and trifunctional and higher polyfunctional (meth)acrylates having a pentaerythritol or dipentaerythritol skeleton. Preferably, the ink composition contains a polyfunctional (methacrylate in addition to a monofunctional (meth)acrylate.

Preferably, the content of the bifunctional or higher polyfunctional (meth)acrylate is 5% to 60% by mass, more preferably 15% to 60% by mass, still more preferably 20% to 50% by mass, relative to the total mass (100% by mass) of the ink composition. By controlling this content in such a range, the ink composition can exhibit higher curability, storage stability and ejection stability.

Examples of the trifunctional and higher polyfunctional (meth)acrylates include trimethylolpropane tri(meth)acrylate, ethylene oxide-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

Preferably, the polymerizable compound contains a monofunctional (meth)acrylate. In this instance, the viscosity of the ink composition is reduced, and the photopolymerization initiator and other constituents can be sufficiently dissolved in the ink. Also, the ink composition can exhibit satisfactory ejection stability during ink jet recording. More preferably, a monofunctional (meth)acrylate and a bifunctional (meth)acrylate are used in combination. The combined use of these compounds enhances the toughness, heat resistance and chemical resistance of the coating of the ink composition. Still more preferably, phenoxyethyl (meth)acrylate and dipropylene glycol di(meth)acrylate are used in combination.

The polymerizable compound content is preferably 5% to 95% by mass, more preferably 15% to 90% by mass, relative to the total mass (100% by mass) of the ink composition. By controlling the polymerizable compound content in such a range, the viscosity and odor of the ink composition can be reduced, and the solubility and reactivity of the photopolymerization initiator can be increased.

Coloring Material

The ink composition may further contain a coloring material. The coloring material may be either one or both of a pigment and a dye.

Pigment

A pigment used as a color material can enhance the light fastness of the ink composition. The pigment may be selected from inorganic pigments or organic pigments.

Exemplary inorganic pigments include carbon blacks (C.I. Pigment Black 7), such as furnace black, lamp black, acetylene black, and channel black; iron oxide; and titanium oxide.

Exemplary organic pigments include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

Carbon blacks may be used for black inks. Examples of such a carbon black include No. 2300, No. 900, MCF 88, No. 33, No. 40, No. 45, No. 52, MA7, MA8, MA100, and No. 2200B (each produced by Mitsubishi Chemical Corporation); Raven 5750, Raven 5250, Raven 5000, Raven 3500, Raven 1255, and Raven 700 (each produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each produced by CABOT); and Color Black FW1, Color Black FW2, Color Black FW2V, Color Black FW18, Color Black FW200, Color Black 5150, Color Black S160, Color Black S170, Printex 35, Printex U, Printex V, Printex 140U, Special Black 6, Special Black 5, Special Black 4A, and Special Black 4 (each produced by Degussa).

Pigments that can be used in a white ink include C.I. Pigment whites 6, 18, and 21.

Pigments that can be used in a yellow ink include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172 and 180.

Pigments that can be used in a magenta ink include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224 and 245, and C.I. Pigment Violets 19, 23, 32, 33, 36, 38, 43 and 50.

Pigments that can be used in a cyan ink include C.I. Pigment Blues 1, 2, 3, 15, 15:1, 15:2, 15:3, 15:34, 15:4, 16, 18, 22, 25, 60, 65 and 66, and C.I. Vat Blues 4 and 60.

Pigments that can be used for colors other than magenta, cyan and yellow include C.I. pigment greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

The above pigments may be used singly or in combination.

If a pigment is used in the ink composition, the average particle size of the pigment is preferably 300 nm or less, and more preferably 50 to 200 nm. Such a pigment can be stably dispersed in the ink composition, and the ink composition can be reliable in, for example, ejection stability, and can form high-quality images. The average particle size mentioned herein is a value measured by dynamic light scattering.

Dye

A dye may be used as a coloring material. Any dye, including acid dyes, direct dyes, reactive dyes, and basic dyes, may be used without particular limitation. Examples of these dyes include C.I. Acid Yellows 17, 23, 42, 44, 79 and 142, C.I. Acid Reds 52, 80, 82, 249, 254 and 289, C.I. Acid Blues 9, 45 and 249, C.I. Acid Blacks 1, 2, 24 and 94, C.I. Food Blacks 1 and 2, C.I. Direct Yellows 1, 12, 24, 33, 50, 55, 58, 86, 132, 142, 144 and 173, C.I. Direct Reds 1, 4, 9, 80, 81, 225 and 227, C.I. Direct Blues 1, 2, 15, 71, 86, 87, 98, 165, 199 and 202, C.I. Direct Blacks 19, 38, 51, 71, 154, 168, 171 and 195, and C.I. Reactive Reds 14, 32, 55, 79 and 249, and C.I. Reactive Blacks 3, 4 and 35.

The above dyes may be used singly or in combination.

The coloring material content is preferably 1% to 20% by mass relative to the total mass (100% by mass) of the ink composition. Such a content results in a high hiding power and a high color reproduction.

Dispersant

If the ink composition contains a pigment, a dispersant may be added so that the pigment can be sufficiently dispersed. The dispersant may be, but is not limited to, a compound that is generally used for preparing a pigment dispersion, such as a polymer dispersant. Examples of polymer dispersant include polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. The dispersant may contain these compound singly or in combination. The polymer dispersant is commercially available. Examples of such a dispersant include AJISPER series produced by Ajinomoto Fine-Techno, Solsperse series such as Solsperse 36000, available from Avecia or Noveon, Disper BYK series produced by BYK, and DISPARLON series produced by Kusumoto Chemicals.

Other Additives

The ink composition may further contain other additives or constituents. Possible additives or constituents include, but are not limited to, a known slip agent (surfactant), polymerization promoter, penetration enhancer, and wetting agent (moisturizing agent). In addition, other additives may be added, such as a fixing agent, a fungicide, a preservative, an antioxidant, an ultraviolet absorbent, a chelating agent, a pH adjuster, and a thickener.

Ink Container

The ink container of an embodiment of the invention contains a UV curable ink jet recording ink composition. The ink container may be, but is not limited to, an ink cartridge, a bag, a bottle, a tank, or a can. Among these, preferred are the ink cartridge, bag, bottle and tank because their oxygen permeation (descried later) can be easily controlled to a desired level. More preferably, bags, particularly plastic film bags, are used.

In the present embodiment, the ink container may be used in any of the following forms of: (A) an ink cartridge apart from the recording apparatus, which is mounted in the recording apparatus so as to deliver the ink composition sequentially to the recording apparatus; (B) a bottle or any other container apart from the recording apparatus, from which the ink is transferred to the recording apparatus before use; and (C) a tank or any other container that contains an ink and is installed in the recording apparatus in advance.

The forms of (A) and (B) each function as an ink container in the period from the time when it has been shipped to the time immediately before the ink is delivered to the recording apparatus. The form of (C) functions as an ink container in the period from the time when it has been shipped until the ink composition is used in the recording apparatus for the first time.

In the use of an ink container in the form of (A) or (C), the recording apparatus performs printing while the ink composition is supplied from the ink container through an ink tube or any other member connected to the ink container.

Also, in the use of an ink container in the form of (B), the recording apparatus performs printing after the ink composition has been transferred to the recording apparatus from the ink container. In the case of form (B), the ink composition is transferred to a tank or the like mounted in the recording apparatus.

The ink container may be made of, but not limited to, plastics, such as polyethylene terephthalate (PET) and polyolefins including polyethylene ethylene-vinyl acetate copolymer and polypropylene, or metals including alloys. Alternatively, the ink container may be made of, for example, a film of a mixture or a composite produced by mixing or laminating some of these polymers.

The material of the ink container that will come in contact with the ink composition preferably has an oxygen permeation rate of 5.0 cc·20 $\mu$m/(m$^2$·day·atm) or less, more preferably 2.0 cc·20 $\mu$m/(m$^2$·day·atm) or less. When the oxygen permeation rate is within these values, the dissolved oxygen content in the ink composition does not vary much during storage. Such a material is not particularly limited. If the ink container is in the form of an ink bag, the ink bag may be made by forming a plastic film into a bag by heat sealing. The plastic film forming the ink bag may be a drawn film made of a high-density, low-density or linear low-density polyethylene, polypropylene, ethylene-vinyl alcohol copolymer, or polystyrene. The plastic film may be a composite film having a plurality of layers. The ink bag may be made of only such a plastic film when the film satisfies the above-described requirement for oxygen permeation, or the film may be provided with a gas barrier layer to obtain an oxygen permeation rate within the above value. The gas barrier layer may be formed of a metal such as aluminum, an inorganic oxide such as silicon oxide or aluminum oxide, or a low oxygen permeation plastic such as ethylene-vinyl alcohol copolymer or polyvinyl alcohol. The plastic film has a thickness of, preferably, 50 µm or more, more preferably 70 µm or more, and still more preferably 70 to 200 µm. When the plastic film has such a thickness, the dissolved oxygen content in the ink composition does not vary much during storage, and the ink bag has high strength and flexibility. Among the materials of the film of the ink bag, ethylene-vinyl alcohol copolymer is advantageous because it has a low oxygen permeation rate and high strength. If the ink container is in a form other than the ink bag, it may be made of, for example, synthetic resin, glass, or metal.

The unit of oxygen permeation rate used herein is cc·20 µm/(m²·day·atm), wherein "atm" represents the pressure (atm) at a temperature of 23° C. and a relative humidity of 65%. The oxygen permeation rate can be determined by measuring the permeation rate of oxygen permeating the film by a method specified in ISO 14663-2: 1999 (Annex C), that is, by using a coulometric sensor (when the relative humidity reaches a state of equilibrium).

The capacity of the ink container is not particularly limited, and is preferably 100 to 2,000 mL, more preferably 100 to 1,000 mL, and still more preferably 200 to 800 mL. Such a capacity helps the ink composition exhibit high curability, storage stability and ejection stability.

When the capacity of the ink container is in such a range, the ink composition can be consumed without varying the dissolved oxygen content in the ink composition after the beginning of the use of the ink container, and the dissolved oxygen does not vary much during storage. Preferably, the ink container is made of a material having an oxygen permeation rate in the above range and can contain a volume of ink composition in the above ranges. In the description herein, the terms "capacity" and "volume" have the same meaning.

An ink bag that is an embodiment of the ink container of the invention will now be described. FIG. 1 is a perspective view of an ink bag 1. The ink bag 1 includes an ink outlet 2 and a film member 10. The film member 10 may be made of any of the above-described materials. The ink bag 1 may be packed in a box or any other container (not shown) for protection during transport. The ink bag 1 may be used as, but not limited to, an ink cartridge in the above-described form (A).

As described above, an embodiment of the invention can provide an ink container containing a UV curable ink jet recording ink composition superior in storage stability, curability and ejection stability.

Ink Jet Recording Apparatus

The ink jet recording apparatus according to an embodiment of the invention includes an ejection device that ejects the UV curable ink jet recording ink composition from a head in a state where the dissolved oxygen content of the ink composition is 20 ppm or less. The ink jet recording apparatus may further include a curing device that irradiates the ink composition ejected to the recording medium with UV radiation to cure the ink composition.

Ejection Device

Figure 2:
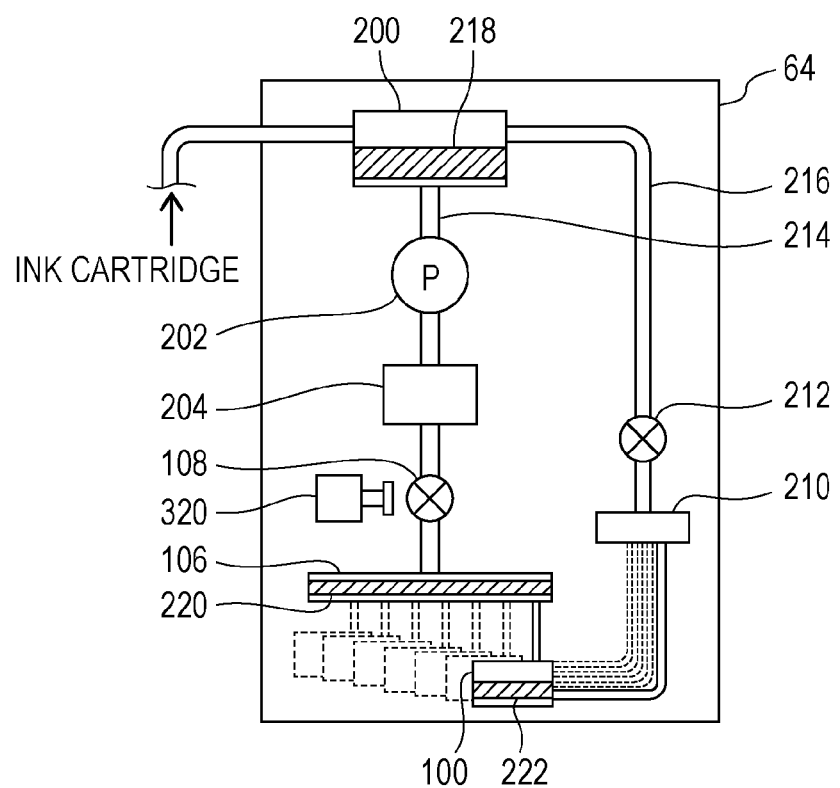
FIG. 2 is a representation of the structure around the head of an ink jet recording apparatus according to an embodiment of the invention.

The ejection device ejects the UV curable ink jet recording ink composition from the head in a state where the dissolved oxygen content of the ink composition is 20 ppm or less. The ejection device will be further described in detail with reference to a drawing, but is not limited to the following embodiment. FIG. 2 is a schematic diagram of the structure around the head of an ink jet recording apparatus according to an embodiment of the invention. An ink composition is supplied to a sub tank 200 from an ink cartridge (not shown), and is then delivered to a plurality of heads 100 by a pressure pump 202 through a deaeration module 204, which is a mechanism for deaerating the ink composition, and a heater 220 in that order.

The head 100 ejects the ink composition onto a recording medium (not shown). A pressure control valve 108 is opened by a valve-opening actuator 320 to control the pressure of the ink composition that will be delivered to the heads 100 from the sub tank 200.

When the pressure control valve 108 is open, the ink composition having passed through the deaeration module 204 flows into a branch connection 106. The flow channel 214 going to the heads 100 is divided into a plurality of paths in the branch connection 106 and connected to the heads 100.

The ink composition remaining in the heads 100 without being discharged returns to the sub tank 200 through an integration joint 210 and a return channel 216 when a switching valve 212 is open. By circulating the ink composition between the sub tank 200 and the heads 100, the ink composition can recover from separation or settling that may be caused by being retained for a long time, and keep the temperature constant. The ink composition may be heated with heaters 218, 220 and 222 to reduce the viscosity to a degree at which the ink composition can be suitably ejected from the heads 100.

These devices are disposed on a main scan transfer table 64 that moves relative to the recording medium, and the ink composition is ejected onto a recording medium from the heads 100 while the main scanning transfer table is moving.

The deaeration module 204 has therein a deaeration chamber (not shown) into which the ink composition flows, and a decompression chamber (not shown) adjacent to the deaeration chamber with a separation membrane therebetween which can be permeated by air, but cannot by liquid. By reducing the pressure of the decompression chamber by a vacuum pump (not shown), gas such as air babbles trapped or oxygen dissolved in the ink composition is removed in the deaeration chamber, so that the ink composition having a lower dissolved oxygen content than the ink composition in the deaeration module 204 can be delivered to the heads 100, and the heads 100 eject the ink composition having such a low dissolved oxygen content. The deaeration module 204 can continuously deaerate the ink composition while delivering the ink composition to the heads 100 from the sub tank 200.

The recording apparatus may have the structure shown in, for example, FIG. 2. The recording apparatus may have a structure like a line printer, which is configured so that the head ejects ink onto a recording medium moving relative to the head instead of moving the above-described transfer table. As an alternative to the deaeration module that continuously deaerates the ink composition as described above, an intermittent type not provided with a separation membrane may be used which alternately perform the operations of deaerating the ink composition by reducing the pressure of the decompression chamber with the pressure control valve closed, and of subsequently delivering the ink composition to the heads with the decompression chamber in a normal state and with the pressure control valve 108 open. The continuously deaerating type is advantageous in continuously deaerating the ink composition, and the intermittently deaerating type is advantageous in deaeration power.

When the ink composition contained in the ink cartridge has a dissolved oxygen content of 20 ppm or less, it is preferable that the dissolved oxygen content in the ink composition be not increased while the ink composition is delivered in the recording apparatus. Thus the ink composition can be highly stably ejected. However, even if the dissolved oxygen content increases during the delivery of the ink composition, the deaeration module can reduce the dissolved oxygen content. Even if the performance of the deaeration module is limited, the head 100 can eject the ink composition in which the dissolved oxygen content is kept 20 ppm or less as long as the dissolved oxygen content of the ink composition in the ink cartridge is 20 ppm or less. The dissolved oxygen content is increased depending on the length and material of the tube or pipe in the recording apparatus through which the ink composition is delivered to the heads, the time taken for delivering the ink composition, and the conditions for applying pressure for delivering the ink composition. The ink container of the present embodiment is therefore advantageous in designing a recording apparatus as desired.

Recording Medium

A recorded article is produced by an ink jet recording method as described below, for example, by ejecting an ink composition onto a recording medium. The recording medium may be absorbent or non-absorbent. The ink jet recording method described below can be widely applied to various recording media from a non-absorbent recording medium into which water-soluble ink compositions cannot penetrate to an absorbent recording medium into which ink compositions easily penetrate. If the ink composition of the above embodiment is used for a non-absorbent recording medium, the medium may be required to be dried after curing the ink composition by UV irradiation.

Absorbent recording media include, but are not limited to, plain paper such as electrophotographic paper having high permeability to inks, ink jet paper having an ink absorbing layer containing silica particles or alumina particles or an ink absorbing layer made of a hydrophilic polymer such as polyvinyl alcohol (PVA) or polyvinyl pyrrolidone (PVP), and art paper, coat paper and cast-coated paper that are used for ordinary offset printing and have relatively low permeability to inks.

Nonabsorbent recording media include, but are not limited to, plastic films or plates, such as those of polyvinyl chloride, polyethylene, polypropylene, and polyethylene terephthalate (PET); metal plates, such as those of iron, silver, copper, and aluminum; metal-coated metal plates or plastic films formed by vapor-depositing those metals on a metal plate or plastic film; and alloy plates, such as those of stainless steel and brass.

Ink Jet Recording Method

The UV curable ink jet recording ink composition contained in an ink container according to an embodiment may be used in an ink jet recording method including ejecting the ink composition onto a recording medium and curing the ink composition by UV irradiation. The ink composition thus forms a coating (cured film) on the recording medium.

Ejection of Ink Composition

For ejecting the ink composition, an ink jet recording apparatus as described above may be used. The ink composition to be ejected may be adjusted to a viscosity of, preferably, 25 mPa·s or less, more preferably 5 to 20 mPa·s. An ink composition having a viscosity in such a range can be ejected at room temperature or without being heated. Alternatively, the ink composition may be heated to a predetermined temperature so that the viscosity of the ink composition is adjusted to a level suitable to be ejected. Thus the ink composition is stably ejected.

UV curable ink compositions generally have a higher viscosity than aqueous ink compositions generally used for ink jet recording. Accordingly, the viscosity of the UV curable ink composition is significantly varied by temperature change during ejection. Such variation in the viscosity of the ink composition affects the size of the ink droplets and the ejection speed of the droplets and may result in a degraded image quality. Accordingly, it is preferable that the ink composition be kept at a constant temperature while being ejected.

Curing of Ink Composition

Subsequently, the ink composition deposited on the recording medium is cured by being irradiated with UV radiation. In other words, the coating of the ink composition formed on the recording medium is turned into a cured film by UV irradiation. More specifically, the photopolymerization initiator in the ink composition is decomposed to produce an initiation species, such as a radical, an acid or a base, by the irradiation with UV radiation, and the initiation species induces polymerization of the polymerizable compound. Alternatively, the polymerizable compound may initiate a photopolymerization reaction by irradiation with UV radiation. At this time, if a sensitizing dye is present in the ink composition together with the photopolymerization initiator, the sensitizing dye is excited by absorbing UV light. The excited sensitizing dye then comes into contact with the photopolymerization initiator and promotes the decomposition of the photopolymerization initiator, and thus, a highly sensitive curing reaction can be performed.

A mercury lamp or a gas or solid laser is generally used as a UV light source. For curing the UV curable ink jet ink composition, a mercury lamp or a metal halide lamp is widely used. However, since the light source is desired to be mercury-free from the viewpoint of environmental protection, the use of GaN-based semiconductor UV emission devices is advantageous in view of industry and environment. Also, UV light-emitting diodes (UV-LEDs) and UV laser diodes (UV-LDs), which are small and inexpensive and have long life and high efficiency, are considered to be a useful light source for UV curing ink jet recording. UV-LEDs are advantageous.

Preferably, the ink composition is cured by being irradiated with UV radiation having an emission peak wavelength in the range of 365 to 405 nm, more preferably 380 to 400 nm. The irradiation is performed at an energy of, preferably, 50 to 500 mJ/cm$^2$, more preferably 100 to 400 mJ/cm$^2$.

When irradiation is performed under such conditions, the ink composition can be rapidly cured at a low energy, depending on the constituents and their contents in the ink composition. The irradiation energy is calculated by multiplying irradiation time by irradiation intensity. The irradiation time can be reduced by altering the ink composition, thus increasing the recording speed. Also, the irradiation intensity can be reduced by altering the ink composition. In this instance, the size and cost of the recording apparatus can be reduced. For UV irradiation, a UV-LED is preferably used as described above. The ink composition used in this case contains a photopolymerization initiator that will be decomposed by irradiation with UV radiation having a wavelength in the above range and a polymerizable compound that will initiate a polymerization by irradiation with UV radiation having a wavelength in the above range. The number of emission peak wavelengths of the UV radiation may be one or two or more. Even if it is plural, the irradiation energy of the UV radiation refers to the entire irradiation energy of UV light having emission peak wavelengths in the above range.

EXAMPLES

The above-described embodiments of the invention will now be further described in detail with reference to Examples. However, the invention is not limited to the Examples.

Raw Materials

The following materials were used in the Examples and Comparative Examples.

Coloring Material:
  C.I. Pigment Black 7 (Microlith Black C-K, produced by BASF, represented as black pigment in the Tables)
Dispersant:
  Solsperse 36000 (produced by Noveon)
Vinyl Ether-Containing (Meth)acrylic Acid Ester
  VEEA (2-(2-vinyloxyethoxy)ethyl acrylate, produced by Nippon Shokubai, abbreviated as VEEA in the Tables)
Other Polymerizable Compounds:
  Biscoat #192 (phenoxyethyl acrylate, produced by Osaka Organic Chemical Industry Ltd., abbreviated as PEA in the Tables)
  SR 508 (dipropylene glycol diacrylate, produced by Sartomer, abbreviated as DPGDA in the Tables)
Hindered Amine Compound (Polymerization Inhibitor)
  ADK STAB LA-82 (1,2,2,6,6-pentamethyl-4-piperidyl methacrylate, produced by ADEKA, abbreviated as LA-82 in the Tables)
  ADK STAB LA-7RD (2,2,6,6-tetramethyl-4-hydroxypiperidin-1-oxyl, produced by ADEKA, abbreviated as LA-7RD in the Tables)
Photopolymerization Initiator:
  DAROCURE TPO (produced by BASF, solid content: 100%)
  IRGACURE 369 (produced by BASF, solid content: 100%)
  Speedcure DETX (produced by Lambson, solid content: 100%)
  Speedcure ITX (produced by Lambson, solid content: 100%)

Examples 1 to 21, Comparative Examples 1 to 6

Preparation of Pigment Dispersion

Before preparing ink compositions, pigment dispersions were prepared. First, 18% by mass of the above-described black pigment and 9% by mass of a dispersant were mixed, followed by stirring for an hour. The resulting mixture was agitated in a bead mill to disperse the pigment, thus yielding a pigment dispersion. The dispersion was performed using zirconia beads of 0.65 mm in diameter with a filling rate of 70% for 2 to 4 hours at a peripheral speed of 9 m/s.

UV Curable Ink Jet Recording Ink Composition

Materials were mixed in a proportion (unit: mass %, percent by mass) according to the composition shown in the Tables. The mixture was agitated with a high-speed water-cooling agitator to prepare a black UV curable ink jet recording ink composition. After the preparation, the ink composition was deaerated. The longer the deaeration time is, the lower the dissolved oxygen content is. Thus, the deaeration time was adjusted so that the dissolved oxygen content would be the value shown in Table 1 or 2.

Measurement of Dissolved Oxygen Content

The dissolved oxygen in the ink composition was measured with a gas chromatograph Agilent 6890 (manufactured by Agilent Technologies). Helium (He) gas was used as carrier gas.

The features of the Examples and Comparative Examples will now be described. Examples 1 to 5 used the same ink composition, but the dissolved oxygen in the ink composition was varied. Comparative Example 1 also used the same ink composition as Examples 1 to 5, but the dissolved oxygen content in the ink composition was very high (30 ppm) relative to that in Examples 1 to 5. Comparative Example 2 was different from Examples 1 to 5 in that the ink composition had a very high dissolved oxygen content (30 ppm) and did not contain a thioxanthone compound.

Examples 6 to 11 used ink compositions having different contents of photopolymerization initiator, namely, thioxanthone compound, and the difference among these ink compositions was evaluated. Comparative Examples 5 and 6 were substantially the same as Example 6 except that the thioxanthone compound was not added for comparison with Examples 6 to 11.

Examples 12 to 16 used ink compositions in which the VEEA content was varied, and the difference among these ink compositions was evaluated.

Examples 17 to 21 used ink compositions in which the type and content of the hindered amine compound were varied, and the difference among these ink compositions was evaluated. Comparative Examples 3 and 4 were different from Examples 17 to 21 in that the ink composition did not contain any hindered amine compound.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Black pigment | — | — | — | — | — | 2.0 | 2.0 | 2.0 | 2.0 | 2.0 | 2.0 |
| Solsperse36000 | — | — | — | — | — | 1.0 | 1.0 | 1.0 | 1.0 | 1.0 | 1.0 |
| VEEA | 30.0 | 30.0 | 30.0 | 30.0 | 30.0 | 30.0 | 30.0 | 30.0 | 30.0 | 30.0 | 30.0 |
| PEA | — | — | — | — | — | 54.9 | 54.9 | 54.9 | 54.9 | 54.9 | 54.9 |
| DPGDA | 57.9 | 57.9 | 57.9 | 57.9 | 57.9 | — | — | — | — | — | — |
| LA-82 | — | — | — | — | — | — | — | — | — | — | — |
| LA-7RD | 0.1 | 0.1 | 0.1 | 0.1 | 0.1 | 0.1 | 0.1 | 0.1 | 0.1 | 0.1 | 0.1 |
| DAROCURE TPO | 10.0 | 10.0 | 10.0 | 10.0 | 10.0 | 10.0 | 10.0 | 10.0 | 10.0 | 9.0 | 8.0 |
| IRGACURE 369 | — | — | — | — | — | 1.5 | 1.0 | 1.0 | — | — | — |
| SpeedcureDETX | 2.0 | 2.0 | 2.0 | 2.0 | 2.0 | 0.5 | 1.0 | — | 1.0 | 1.5 | 2.0 |
| SpeedcureITX | — | — | — | — | — | — | — | 1.0 | 1.0 | 1.5 | 2.0 |
| Total | 100 | 100 | 100 | 100 | 100 | 100 | 100 | 100 | 100 | 100 | 100 |
| Dissolved oxygen content | 20 | 15 | 10 | 5 | 1 | 10 | 10 | 10 | 10 | 10 | 10 |
| Curability | A | A | A | A | A | B | A | A | A | A | A |
| Storage stability | A | A | A | B | C | A | A | A | A | A | A |
| Ejection stability | C | A | A | A | A | A | A | B | B | C | C |

TABLE 1-continued

| | Example | | | | | | | | | |
|---|---|---|---|---|---|---|---|---|---|---|
| | 12 | 13 | 14 | 15 | 16 | 17 | 18 | 19 | 20 | 21 |
| Black pigment | — | — | — | — | — | 2.0 | 2.0 | 2.0 | 2.0 | 2.0 |
| Solsperse36000 | — | — | — | — | — | 1.0 | 1.0 | 1.0 | 1.0 | 1.0 |
| VEEA | 10.0 | 30.0 | 50.0 | 70.0 | 80.0 | 30.0 | 30.0 | 30.0 | 30.0 | 30.0 |
| PEA | 47.9 | 27.9 | 7.9 | — | — | 24.9 | 24.9 | 24.5 | 24.95 | 54.90 |
| DPGDA | 30.0 | 30.0 | 30.0 | 17.9 | 7.9 | 30.0 | 30.0 | 30.0 | 30.0 | — |
| LA-82 | — | — | — | — | — | — | 0.1 | 0.5 | 0.05 | — |
| LA-7RD | 0.1 | 0.1 | 0.1 | 0.1 | 0.1 | 0.1 | — | — | — | 0.1 |
| DAROCURE TPO | 10.0 | 10.0 | 10.0 | 10.0 | 10.0 | 10.0 | 10.0 | 10.0 | 10.0 | 10.0 |
| IRGACURE 369 | — | — | — | — | — | — | — | — | — | 1.5 |
| SpeedcureDETX | — | — | — | — | — | 1.0 | 1.0 | 1.0 | 1.0 | 0.5 |
| SpeedcureITX | 2.0 | 2.0 | 2.0 | 2.0 | 2.0 | 1.0 | 1.0 | 1.0 | 1.0 | — |
| Total | 100 | 100 | 100 | 100 | 100 | 100 | 100 | 100 | 100 | 100 |
| Dissolved oxygen content | 10 | 10 | 10 | 10 | 10 | 10 | 10 | 10 | 10 | 20 |
| Curability | B | A | A | A | A | A | A | B | A | B |
| Storage stability | A | A | A | B | C | A | C | A | B | A |
| Ejection stability | A | A | A | A | A | A | A | A | A | C |

TABLE 2

| | Comparative Example | | | | | |
|---|---|---|---|---|---|---|
| | 1 | 2 | 3 | 4 | 5 | 6 |
| Black pigment | — | — | 2.0 | 2.0 | 2.0 | 2.0 |
| Solsperse36000 | — | — | 1.0 | 1.0 | 1.0 | 1.0 |
| VEEA | 30.0 | 30.0 | 10.0 | 30.0 | 30.0 | 30.0 |
| PEA | — | — | 45.0 | 25.0 | 54.9 | 54.9 |
| DPGDA | 57.9 | 57.9 | 30.0 | 30.0 | — | — |
| LA-82 | — | — | — | — | — | — |
| LA-7RD | 0.1 | 0.1 | — | — | 0.1 | 0.1 |
| DAROCURE TPO | 10.0 | 10.0 | 10.0 | 10.0 | 10.0 | 10.0 |
| IRGACURE 369 | — | 2.0 | — | — | 2.0 | 2.0 |
| SpeedcureDETX | 2.0 | — | 1.0 | 1.0 | — | — |
| SpeedcureITX | — | — | 1.0 | 1.0 | — | — |
| Total | 100.0 | 100.0 | 100.0 | 100.0 | 100.0 | 100.0 |
| Dissolved oxygen content | 30 | 30 | 10 | 10 | 20 | 10 |
| Curability | B | C | A | A | C | C |
| Storage stability | A | A | D | E | A | A |
| Ejection stability | E | C | A | A | B | A |

Evaluation

The curability, storage stability and ejection stability of the UV curable ink jet recording ink compositions prepared in the Examples and Comparative Examples, in which the dissolved oxygen content was controlled by adjusting the deaeration time, were evaluated as below. The evaluation of curability and ejection stability and the measurement of the dissolved oxygen content were performed on the ink composition that had been stored under the conditions for the evaluation of storage stability.

1. Storage Stability

Ink bags as shown in FIG. 1 were prepared as the ink containers. The ink compositions of the Examples and Comparative Examples were each enclosed in the ink bags and stored in an oven of 60° C. for 20 days. After the storage, the increase in viscosity was determined. The ink bag had a capacity of 700 mL, and was made of an ethylene-vinyl alcohol copolymer film (oxygen permeation rate: 2.0 cc·20 µm/(m²·day·atm) having a thickness of 100 µm. The evaluation criteria were as follows, and the results are shown in the Tables:

A: 3% or less
B: more than 3% and 6% or less
C: more than 6% and 9% or less
D: more than 9% and 12% or less
E: more than 12%

2. Curability

Coatings having a thickness of 10 µm were formed by applying each of the ink compositions of the Examples and Comparative Examples to a PET film (PET 50A PL series manufactured by LINTEC) using a bar coater. Then, the coating was cured by irradiated with UV radiation having an irradiation intensity of 1,100 mW/cm² and a wavelength of 395 nm. The cured coating (cured film) was rubbed 10 times at a load of 100 g with a cotton swab, and the irradiation energy (curing energy) at the time when the coating was hardened to the extent that the rubbing did not cause abrasion was measured.

Irradiation energy (mJ/cm²) were calculated as a product of the irradiation intensity (mW/cm²) at a surface irradiated from the light source and the time (s) for which the irradiation had been continued. Irradiation intensity was measured with a UV intensity meter UM-10 and a light receiver UM-400 (each produced by Konica Minolta Sensing, Inc.) The evaluation criteria were as follows, and the results are shown in the Tables:

A: 150 mJ/cm² or less
B: more than 150 mJ/cm² and 200 mJ/cm² or less
C: more than 200 mJ/cm² and 250 mJ/cm² or less
D: more than 250 mJ/cm² and 300 mJ/cm² or less
E: more than 300 mJ/cm²

3. Ejection Stability

An ink jet apparatus (trial model) for evaluation was prepared which had 180 nozzles that had a diameter of 20 µm and were adjusted so as to be operated at a frequency of 24 kHz to eject 5 ng of ink for each ejection. The ink composition was continuously ejected from the apparatus, and the number of the nozzles that had caused ejection failure was counted. The evaluation criteria were as follows, and the results are shown in the Tables:

A: None (0)
B: 1 to 5
C: 6 to 10
D: 11 to 15
E: 16 or more

The results show that the ink compositions (of the Examples) containing a thioxanthone-based photopolymerization initiator and a hindered amine compound and has a dissolved oxygen content of 20 ppm or less were superior in curability, storage stability and ejection stability to other ink compositions (Comparative Examples).

Also, the ink composition of Example 2 was further examined in the same manner as above after being stored in an oven of 60° C. for 20 days, except that the capacity of the ink bag was 50 mL. The results are that the dissolved oxygen content was 18 ppm; the storage stability was A; the curability was A; and the ejection stability was B.

Furthermore, the ink composition of Example 2 was still further examined in the same manner as above after being stored in an oven of 60° C. for 20 days, except that the ink composition was enclosed in an ink bag of a polyacrylonitrile film (oxygen permeation rate: 10.0 cc·20 μm/(m²·day·atm) having a thickness of 70 μm. The results are that the dissolved oxygen content was 20 ppm; the storage stability was A; the curability was A; and the ejection stability was C.

These results suggest that the ink composition containing no thioxanthone-based photopolymerization initiator and having a high dissolved oxygen content is inferior in curability, and that the ink composition containing a thioxanthone-based photopolymerization initiator and having a high dissolved oxygen content exhibits improved ejection stability, but is inferior in curability. The comparison between Comparative Examples 1 and 2 show that the ink composition containing a thioxanthone compound is inferior in ejection stability when both ink compositions have the same dissolved oxygen content.

The ink bag containing the ink composition was loaded as an ink cartridge in the recording apparatus shown in FIG. 2, and the ink composition was delivered to the heads 100. Then, the dissolved oxygen contents of the ink composition in the sub tank 200 and the heads 100 were measured. The results are that the dissolved oxygen contents of the ink composition of Example 1 were 27 ppm in the sub tank 200 and 20 ppm in the heads 100, and that those of the ink composition of Comparative Example 1 were 36 ppm in the sub tank 200 and 31 ppm in the heads 100.

The entire disclosure of Japanese Patent Application No.:2012-250940, filed Nov. 15, 2012 is expressly incorporated by reference herein.

What is claimed is:

1. A UV curable ink jet recording ink composition comprising:
   a thioxanthone-based photopolymerization initiator; and a hindered amine compound,
   wherein the ink composition has an dissolved oxygen content is in the range of 5 to 20 ppm ,
   wherein the hindered amine compound content is from 0.05 to 0.5% by mass relative to the total mass of the ink composition.

2. The UV curable ink jet recording ink composition according to claim 1, wherein the thioxanthone-based photopolymerization initiator content is 0.5% to 4% by mass.

3. The UV curable ink jet recording ink composition according to claim 1, wherein the hindered amine compound has a 2,2,6,6-tetramethylpiperidine-N-oxyl skeleton.

4. The UV curable ink jet recording ink composition according to claim 1, wherein the thioxanthone-based photopolymerization initiator contains at least one compound selected from the group consisting of thioxanthone, diethylthioxanthone, isopropylthioxanthone, and chlorothioxanthone.

5. The UV curable ink jet recording ink composition according to claim 1, wherein the thioxanthone-based photopolymerization initiator contains diethylthioxanthone.

6. The UV curable recording ink composition according to claim 1, further containing an acylphosphine oxide-based photopolymerization initiator.

7. An ink container comprising:
   the UV curable ink jet recording ink composition as set forth in claim 1; and a member in contact with the ink composition.

8. An ink container comprising:
   the UV curable ink jet recording ink composition as set forth in claim 2; and a member in contact with the ink composition.

9. An ink container comprising:
   the UV curable ink jet recording ink composition as set forth in claim 3; and a member in contact with the ink composition.

10. An ink container comprising:
    the UV curable ink jet recording ink composition as set forth in claim 4; and a member in contact with the ink composition.

11. An ink container comprising:
    the UV curable ink jet recording ink composition as set forth in claim 5; and a member in contact with the ink composition.

12. An ink container comprising:
    the UV curable ink jet recording ink composition as set forth in claim 6; and a member in contact with the ink composition.

13. The ink container according to claim 7, wherein the member is made of a material having an oxygen permeation rate of 5.0 cc·20 μm/(m²·day·atm) or less at a temperature of 23° C. and a relative humidity of 65%.

14. An ink jet recording method using the UV curable ink jet recording ink composition as set forth in claim 1.

15. An ink jet recording method using the UV curable ink jet recording ink composition as set forth in claim 2.

16. An ink jet recording method using the UV curable ink jet recording ink composition as set forth in claim 3.

17. An ink jet recording method using the UV curable ink jet recording ink composition as set forth in claim 4.

18. An ink jet recording method using the UV curable ink jet recording ink composition as set forth in claim 5.

* * * * *